United States Patent
Ishii et al.

(10) Patent No.: US 12,327,443 B2
(45) Date of Patent: Jun. 10, 2025

(54) MONITORING APPARATUS AND MONITORING METHOD

(71) Applicant: Panasonic Intellectual Property Management Co., Ltd., Osaka (JP)

(72) Inventors: Kou Ishii, Osaka (JP); Kaoru Yokota, Hyogo (JP); Takayuki Fujii, Osaka (JP); Akihito Takeuchi, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 183 days.

(21) Appl. No.: 18/100,834

(22) Filed: Jan. 24, 2023

(65) Prior Publication Data

US 2023/0282040 A1    Sep. 7, 2023

(30) Foreign Application Priority Data

Mar. 3, 2022    (JP) .................. 2022-032538

(51) Int. Cl.
    *G07C 5/08*    (2006.01)
(52) U.S. Cl.
    CPC .......... *G07C 5/0808* (2013.01); *G07C 5/085* (2013.01)

(58) Field of Classification Search
    CPC ..... G07C 5/0808; G07C 5/085; G06F 21/554; G06F 21/552; H04L 63/1425
    See application file for complete search history.

(56) References Cited

U.S. PATENT DOCUMENTS

| 11,373,464 | B2 | 6/2022 | Ogawa et al. |
| 2020/0128031 | A1* | 4/2020 | Juliato ............. H04L 63/1416 |
| 2020/0134937 | A1 | 4/2020 | Ogawa et al. |

FOREIGN PATENT DOCUMENTS

| JP | 2019-016248 | 1/2019 |
| JP | 6787262 | 11/2020 |

* cited by examiner

*Primary Examiner* — Rodney A Butler
(74) *Attorney, Agent, or Firm* — Greenblum and Bernstein, P.L.C.

(57) ABSTRACT

An integrated monitoring apparatus is mounted on a vehicle. An evidence log collection unit that of the integrated monitoring apparatus starts collecting a log from an ECU mounted on the vehicle when a predetermined log collection start condition is met. A determination unit of the integrated monitoring apparatus determines whether the ECU is operating normally based on the log of the ECU collected. When the ECU is determined to be operating normally, the log collection unit of the integrated monitoring apparatus stops collecting the log from the ECU.

12 Claims, 7 Drawing Sheets

FIG. 4

RELATED ECU TABLE

| DETECTION ECU | RELATED ECU |
|---|---|
| ECU A | ECU B, ECU D, ECU E(END) |
| ECU B | ECU A, ECU D, ECU E(END) |
| ECU C | ECU F, ECU G(END) |
| ... | |

FIG. 5

CONTROL INFORMATION TABLE

| IMPORTANT PROCESS | PROCESS IN DETECTION ECU | PROCESS IN RELATED ECU (END) | PROCESS IN RELATED ECU (NON-END) |
|---|---|---|---|
| SYSTEM LOGIN | START OF EVIDENCE LOG COLLECTION | START OF EVIDENCE LOG COLLECTION | START OF EVIDENCE LOG COLLECTION |
| SOFTWARE UPDATE | START OF EVIDENCE LOG COLLECTION | START OF EVIDENCE LOG COLLECTION + START OF IPS OPERATION | START OF EVIDENCE LOG COLLECTION |
| ADAS SYSTEM START | START OF EVIDENCE LOG COLLECTION + START OF IPS OPERATION | START OF EVIDENCE LOG COLLECTION + START OF IPS OPERATION | START OF EVIDENCE LOG COLLECTION |
| ... | ... | ... | ... |

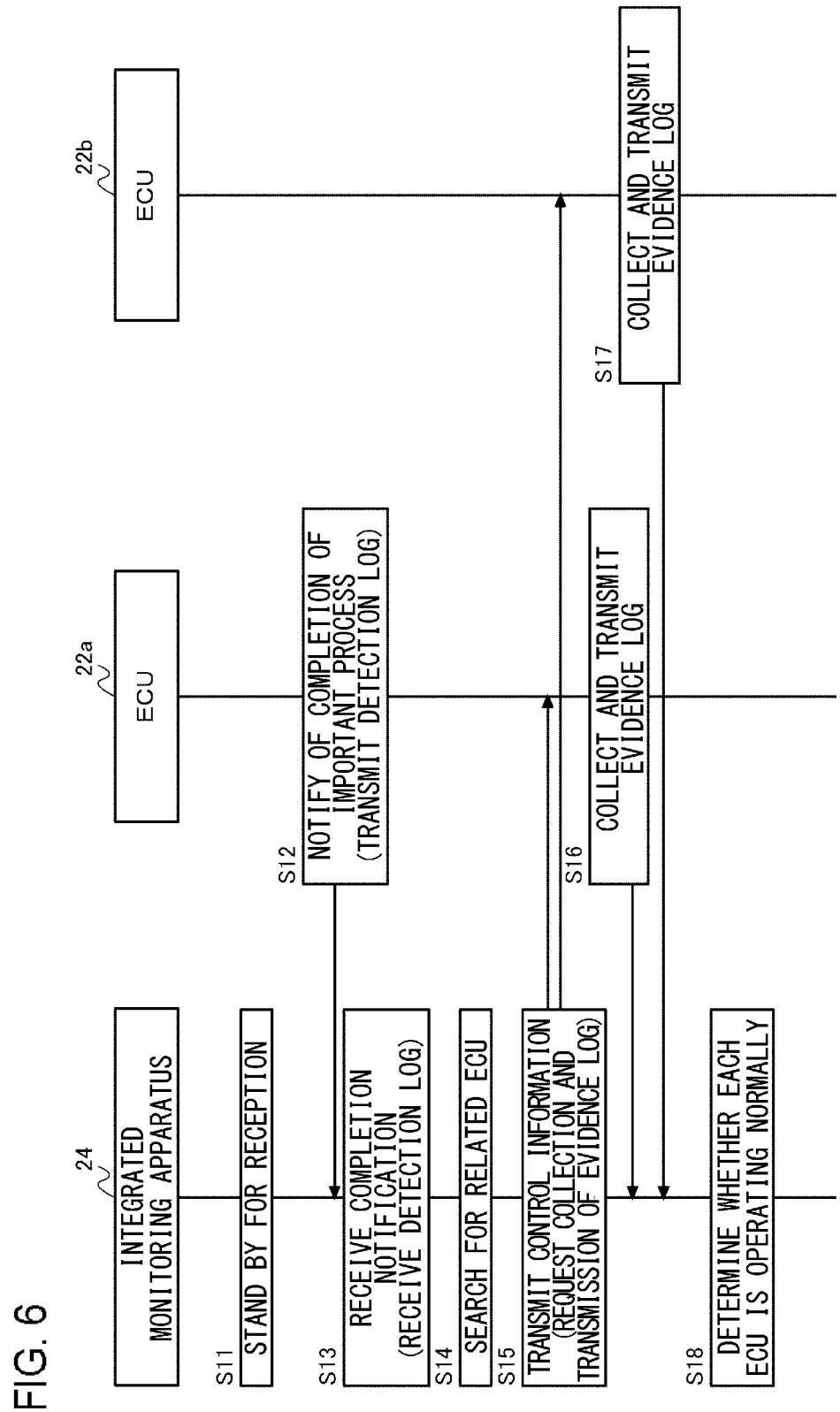

MONITORING APPARATUS AND MONITORING METHOD

BACKGROUND

1. Field

The present disclosure relates to a data processing technology and, more particularly, to a monitoring apparatus and a monitoring method.

2. Related Art

A technology whereby a relay apparatus mounted on a vehicle sets a trigger condition in a sensor mounted on the vehicle in accordance with information provided from an external server, and, when a notification that the trigger condition is met is provided from the sensor, log information is collected from a target apparatus mounted on the vehicle, and the collected log information is transmitted to a server (see, for example, patent literature 1).

[Patent literature 1] JP2019-16248

According to the technology disclosed in patent literature 1, a log may be collected even when it is not necessary to collect a log, such as when an attack ends or when an abnormality is detected in error, which could waste computer resources such as the memory and the storage.

SUMMARY

The present disclosure addresses the above-described issue, and a purpose thereof is to provide a technology of preventing a log of a functional unit of a vehicle from being collected excessively.

A monitoring apparatus according to an embodiment of the present disclosure is a monitoring apparatus mounted on a vehicle, including: a log collection unit that starts collecting a log from a functional unit mounted on the vehicle when a predetermined log collection start condition is met; and a determination unit that determines whether the functional unit is operating normally based on the log of the functional unit collected by the log collection unit. When the determination unit determines that the functional unit is operating normally, the log collection unit stops collecting the log from the functional unit.

Another embodiment of the present disclosure relates to a monitoring method. The monitoring method is a method executed by a computer mounted on a vehicle, including starting to collect a log from a functional unit mounted on the vehicle when a predetermined log collection start condition is met; determining whether the functional unit is operating normally based on the log of the functional unit collected; and, when the functional unit is determined to be operating normally, stopping collection of a log from the functional unit.

Optional combinations of the aforementioned constituting elements, and implementations of the present disclosure in the form of computer programs, recording mediums encoded with computer programs, etc. may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 4 shows an example of the related ECU table;

FIG. 5 shows an example of the control information table;

FIG. 6 is a sequence chart showing the operation relating to the integrated monitoring apparatus of the embodiment.

DETAILED DESCRIPTION

The invention will now be described by reference to the preferred embodiments. This does not intend to limit the scope of the present invention, but to exemplify the invention.

The device or the entity that executes the method according to the disclosure is provided with a computer. By causing the computer to run a program, the function of the device or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The terms IC and LSI may change depending on the integration degree, and the processor may be comprised of a system LSI, a Very Large Scale Integration (VLSI), or an Ultra Large Scale Integration (ULSI). A field programmable gate array (FPGA), which is programmed after an LSI is manufactured, or a reconfigurable logic device, in which connections inside the LSI can be reconfigured or circuit compartments inside the LSI can be set up, can be used for the same purpose. The plurality of electronic circuits may be integrated in one chip or provided in a plurality of chips. The plurality of chips may be aggregated in one device or provided in a plurality of apparatuses. The program may be recorded in a non-transitory recording medium such as a computer-readable read only memory (ROM), optical disk, and hard disk drive or recorded in a non-transitory storage medium such as a computer-readable random access memory (RAM). The program may be stored in a recording medium in advance or supplied to a recording medium or a storage medium via a wide area communication network including the Internet.

Figure 1:
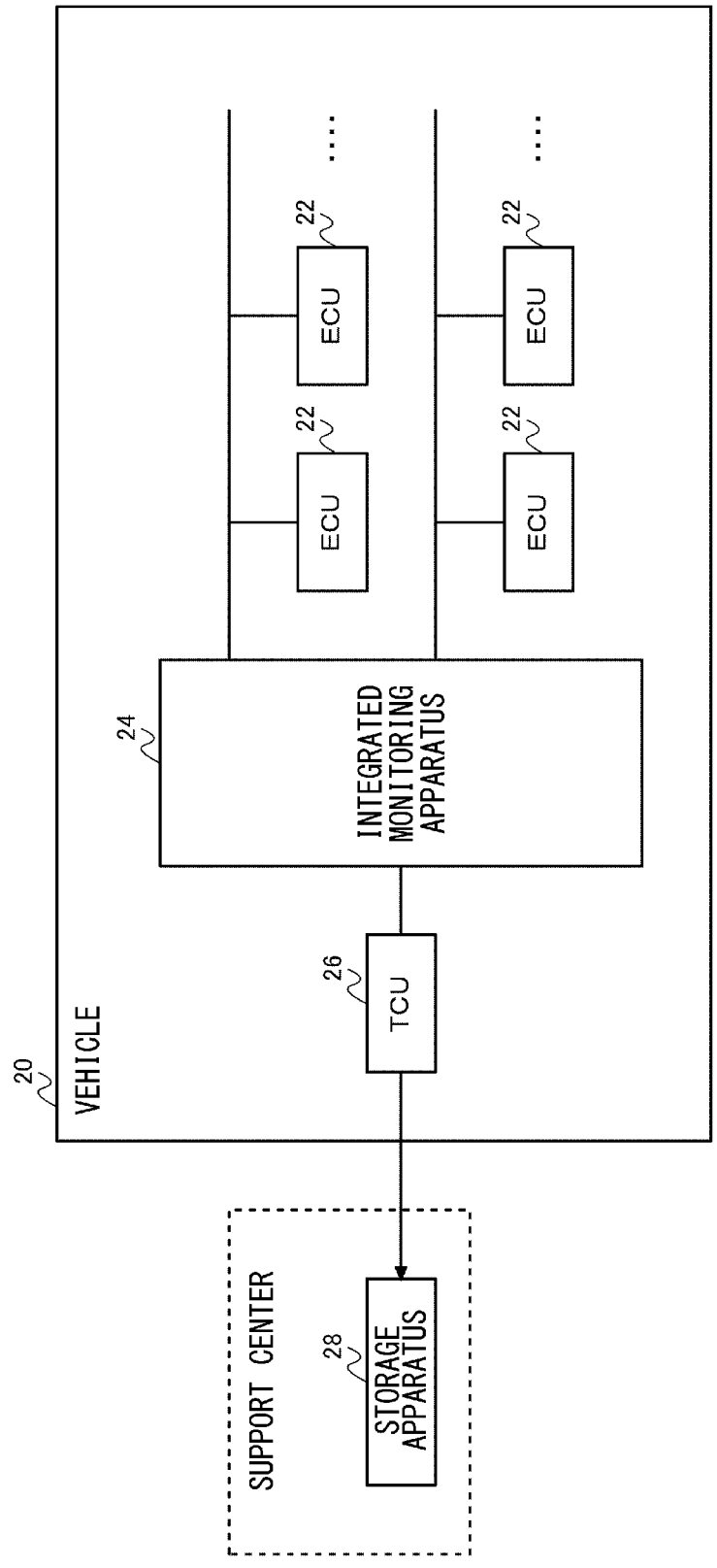
FIG. 1 shows a configuration relating to an integrated monitoring apparatus according to an embodiment.

FIG. 1 shows a configuration relating to an integrated monitoring apparatus 24 according to an embodiment. The integrated monitoring apparatus 24 is an information processing apparatus provided in a vehicle 20. The integrated monitoring apparatus 24 is connected to a plurality of functional units (in this embodiment, Electronic Control Units (ECU) 22) subject to monitoring via a publicly known vehicle-mounted network such as an Ethernet (registered trademark), a Controller Area Network (CAN), and a Media Oriented System Transport (MOST) (registered trademark). The ECU 22 may include a microcontroller comprised of a CPU and a memory. The integrated monitoring apparatus 24 may also be implemented as an ECU.

The integrated monitoring apparatus 24 analyzes an attack to the ECU 22 or an abnormality in the ECU 22 and also outputs information necessary for analysis at the support center. For example, the integrated monitoring apparatus 24 acquires a plurality of logs from a plurality of ECUs 22. The integrated monitoring apparatus 24 transmits information (e.g., an analysis result or a log itself) based on the plurality of logs acquired from the plurality of ECUs 22 to a storage apparatus 28 of the support center via a Telematics Control Unit (TCU) 26. The integrated monitoring apparatus 24 or the support center analyzes, for example, a situation of attack (type, route, site of damage, influence rate, etc.).

Figure 2:
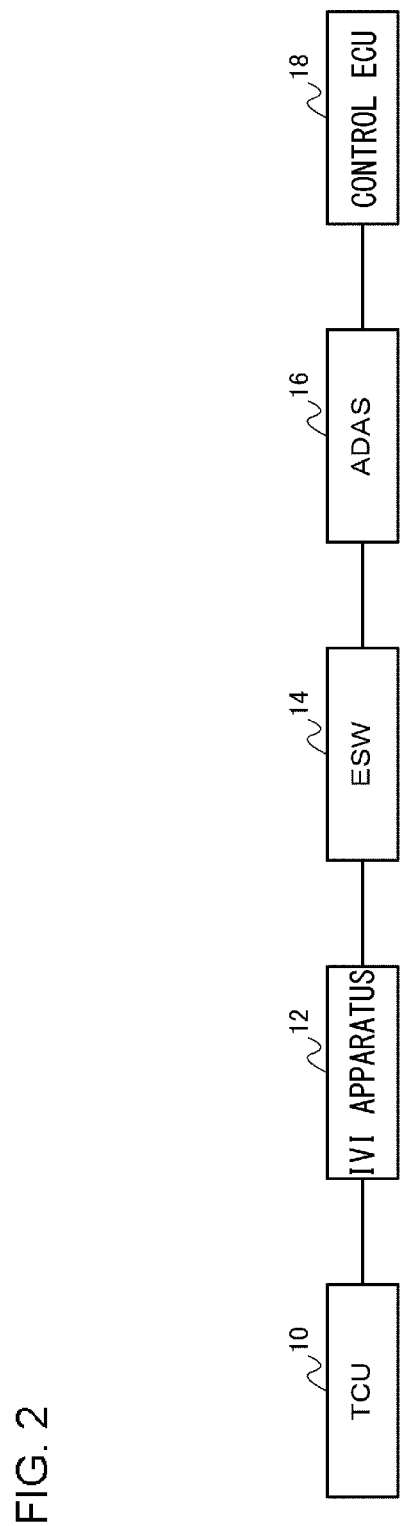
FIG. 2 shows an example of a system built in the vehicle.

FIG. 2 shows an example of a system (vehicle-mounted system) built in the vehicle 20. In the vehicle-mounted system of FIG. 2, a plurality of ECUs are connected. The plurality of ECUs of FIG. 2 correspond to the plurality of ECUs 22 of FIG. 1. More specifically, the plurality of ECUs of FIG. 2 include a TCU 10, an In-Vehicle Infotainment (IVI) apparatus 12, an Ethernet Switch (ESW) ("Ethernet" is a registered trademark) 14, an Advance Driver-Assistance Systems (ADAS) 16, and a control ECU 18.

The TCU 10 communicates with an apparatus outside the vehicle. The IVI apparatus 12 may be, for example, a car navigation apparatus or multimedia equipment. The ADAS 16 may be an automatic driving controller or a cruise controller. The control ECU 18 is an ECU for controlling the behavior of the vehicle. For example, the control ECU 18 may be an engine control ECU, a brake control ECU, or a steering control ECU.

It is assumed here that an important process (e.g., software update) is executed in the IVI apparatus 12 of FIG. 2. Even when the important process is authorized, i.e., when it is not necessary to collect a log from the IVI apparatus 12, etc., the log is collected from the IVI apparatus 12, etc. in the related art. This could create excessive collection of logs and waste computer resources of the vehicle 20 such as the memory and the storage.

It is assumed, on the other hand, that the important process in the IVI apparatus 12 is a spoofing attack, and, for example, a preparation for an attack on the ADAS 16 using the IVI apparatus 12 as a springboard. In the related art, the attack is first detected by the ADAS 16 and collection of a log is started. In this case, a log before the detection of the attack is not collected so that the behavior of the IVI apparatus 12 and the ESW 14 before the detection of the attack cannot be known, which may make it difficult to fully analyze the attack.

The integrated monitoring apparatus 24 of the embodiment starts collecting a log from the ECU in which an important process is executed and the ECU related to that ECU, when a log collection start condition relating to the execution of an important process in the ECU subject to monitoring. When the integrated monitoring apparatus 24 determines that the important process executed is authorized, based on the collected log, the integrated monitoring apparatus 24 stops collecting the log and eliminates the log collected thus far. In this way, excessive collection of logs is prevented, and computer resources of the vehicle 20 such as the memory, storage, etc. are prevented from being wasted.

Figure 3:
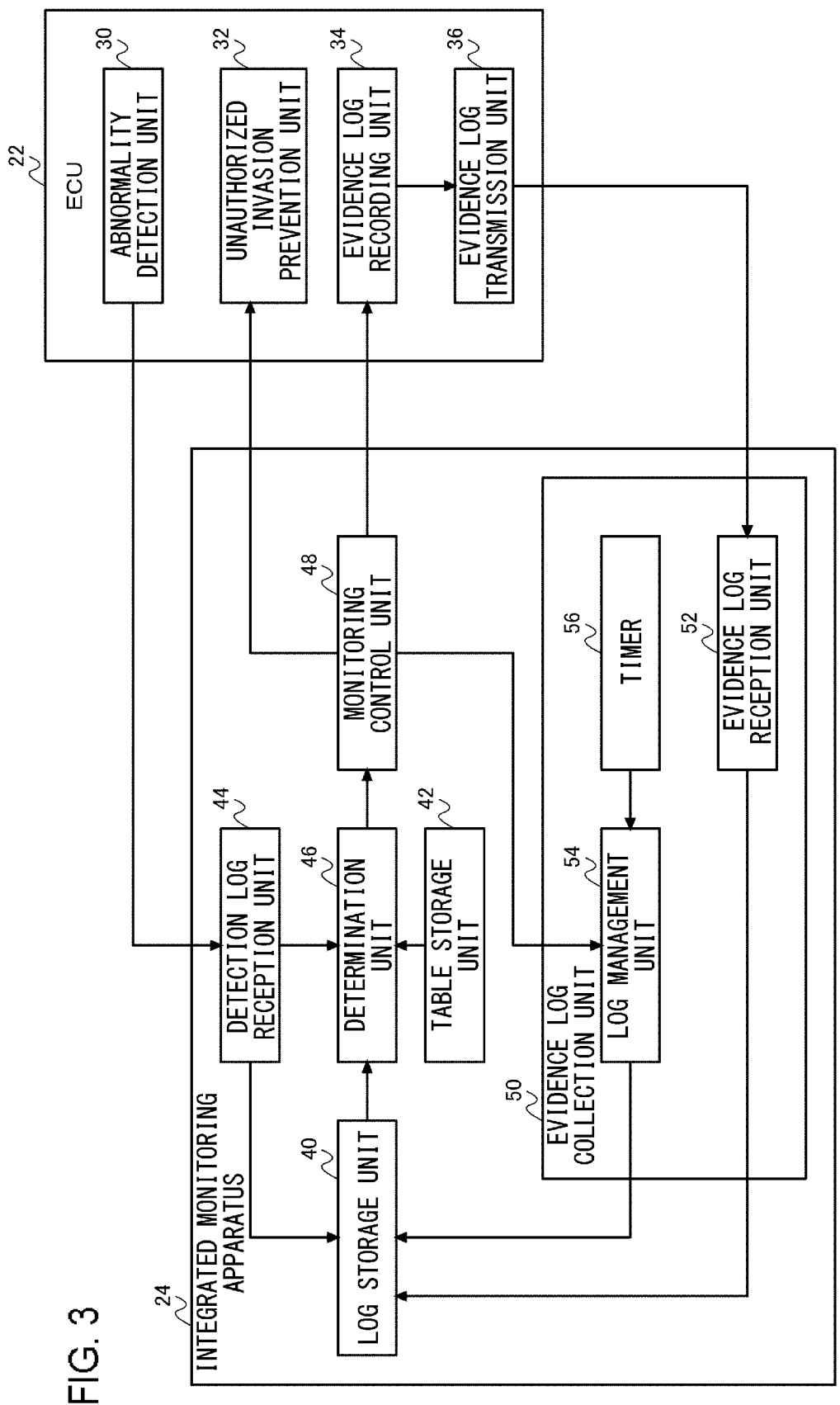
FIG. 3 is a block diagram showing main functional blocks of the ECU and the integrated monitoring apparatus of FIG. 1.

FIG. 3 is a block diagram showing main functional blocks of the ECU 22 and the integrated monitoring apparatus 24 of FIG. 1. The blocks depicted in the block diagram of this disclosure are implemented in hardware such as devices and mechanical apparatus exemplified by a CPU and a memory of a computer, and in software such as a computer program. FIG. 3 depicts functional blocks implemented by the cooperation of these elements. Therefore, it will be understood by those skilled in the art that the functional blocks may be implemented in a variety of manners by a combination of hardware and software.

The ECU 22 includes an abnormality detection unit 30, an unauthorized invasion prevention unit 32, an evidence log recording unit 34, and an evidence log transmission unit 36. A computer program implementing these plurality of functional blocks may be installed in the storage of the ECU 22. The processor (CPU, etc.) of the ECU 22 may cause the plurality of functional blocks above to exhibit their functions by reading the computer program into the main memory and running the computer program.

The abnormality detection unit 30 can be said to be an Intrusion Detection System (IDS) and detects an abnormality of the ECU 22. The abnormality detection unit 30 of the embodiment detects that a predefined important process is executed in the ECU 22. When the abnormality detection unit 30 detects the execution of an important process, the abnormality detection unit 30 transmits, to the integrated monitoring apparatus 24, log data (hereinafter, also referred to as "detection log") including an ID relating to the detection (hereinafter, "detection ID"), identification information on the ECU 22 in which the important process is executed, and the type of the important process. The detection log can be said to be an important process completion notification.

An important process can be said to be a process that could affect the behavior of the ECU 22 or the vehicle 20 seriously. For example, an important process is inclusive of (1) system login, (2) software update, and (3) ADAS system start. (1) System login is login with the manager authority of the ECU 22. (2) Software update is, for example, a process of correcting a bug in the ECU 22 or adding or modifying a function. (3) ADAS system start is, for example, a process of starting cruise control or automatic driving. For execution of (1) or (2), the manager authority is typically necessary. In other words, an important process is inclusive of a process that requires the manager authority for execution.

The unauthorized invasion prevention unit 32 can be said to be an Intrusion Prevention System (IPS) and executes a publicly known unauthorized invasion prevention process. For example, the unauthorized invasion prevention unit 32 may prohibit, as the unauthorized invasion prevention process, an access to a particular port of the ECU 22 from an external apparatus.

The evidence log recording unit 34 generates log data (hereinafter, "evidence log") that sequentially records the current behavior and state of the ECU 22, in response to an instruction from the integrated monitoring apparatus 24. The evidence log includes information relating to communication with a further apparatus. Further, the evidence log is retained in a format that can be referred to from the detection log. The evidence log transmission unit 36 transmits the evidence log generated by the evidence log recording unit 34 to the integrated monitoring apparatus 24.

According to the method of the embodiment for referring to the evidence log from the detection log, the detection ID attached to the payload of the evidence log is directly designated. In other words, the evidence log according to the embodiment is configured to include the detection ID designated by the instruction from the integrated monitoring apparatus 24. In a further method for referring to the evidence log from the detection log, the time stamp attached to the payload of a packet may be designated. Alternatively, the evidence log may be designated by a file path for the evidence log retained in the storage.

FIG. 3 depicts one ECU 22. In practice, however, a plurality of ECUs 22 are mounted on the vehicle 20 as depicted in FIG. 1. The integrated monitoring apparatus 24 transmits and receives data to and from the plurality of ECUs 22.

The integrated monitoring apparatus 24 includes a log storage unit 40, a table storage unit 42, a detection log reception unit 44, a determination unit 46, a monitoring control unit 48, and an evidence log collection unit 50. A computer program implementing these plurality of functional blocks may be installed in the storage of the integrated monitoring apparatus 24. The processor (CPU, etc.) of the integrated monitoring apparatus 24 may cause the plurality of functional blocks to exhibit their functions by reading the computer program into the main memory and running the computer program.

The log storage unit 40 stores the detection log and the evidence log transmitted from the ECU 22. The log storage unit 40 stores the detection log and the evidence log including the same detection ID, i.e., the detection log and the evidence log based on the same important process, associating the detection log and the evidence log with each other.

The table storage unit 42 stores a related ECU table that the determination unit 46 refers to when searching for a related ECU. FIG. 4 shows an example of the related ECU table. The related ECU table stores a record that associates a detection ECU with a related ECU. The detection ECU is an ECU transmitting the detection log, i.e., the ECU in which the important process is executed. The related ECU is an ECU related to the detection ECU. For example, the related ECU may be the ECU adjacent to the detection ECU. Alternatively, the related ECU may be the ECU provided on the signal transmission route on which the detection ECU is provided.

In the example of FIG. 4, the ECU A, ECU B, ECU D, and ECU E are connected in the stated order, and the ECU C, ECU F, and ECU G are connected in the stated order. Flag data indicating an end is set in the ECU provided at the end of the signal transmission route, namely, the ECU E and the ECU G in the example of FIG. 4. The ECU provided at the end of the signal transmission route is the ECU located at the farthest position along the signal transfer route from outside the vehicle 20 and corresponds to the control ECU 18 in the example of FIG. 2. The related ECU table of FIG. 4 stores the information on the related ECU for each detection ECU. In a variation, the related ECU table may store information indicating the signal transfer route such as "ECU A→ECU B→ECU D→ECU E".

The table storage unit 42 further stores a control information table that the determination unit 46 refers to when determining the detail of control on each ECU. FIG. 5 shows an example of the control information table. The control information table stores a record that associates (1) the type of the important process executed in the ECU 22, (2) the process in the detection ECU, (3) the process in the related ECU (end), and (4) the process in the related ECU (non-end) with each other. (2) The process in the detection ECU is the detail of control on the detection ECU. (3) The process in the related ECU (end) is the detail of control on the related ECU located at the end of the signal transfer route. (4) The process in the related ECU (non-end) is the detail of control on the related ECU located at a position other than the end of the signal transfer route.

"Start of IPS operation" shown in FIG. 5 indicates activating the unauthorized invasion prevention function (IPS) of the ECU 22. The control information table may define the same detail of control on the detection ECU and on the related ECU or may define different details of control on the detection ECU and on the related ECU. Alternatively, different details of control may be defined for a plurality of related ECUs in accordance with the priority of monitoring of each ECU.

In the example of FIG. 4 the details of control are defined such that the priority of monitoring of the related ECU at the end of the signal transfer route is higher, i.e., to enhance the safety of the related ECU at the end of the signal transfer route. More specifically, control information requesting a start of IPS operation in addition to a start of evidence log collection is defined for the related ECU at the end of the signal transfer route. The ECU provided at the end of the signal transfer route could affect the behavior of the vehicle 20 directly and seriously, as in the case of control ECU 18 of FIG. 2. Thus, the safety of the vehicle 20 can be enhanced effectively by enhancing the safety of the ECU at the end of the signal transfer route.

Referring back to FIG. 3, the detection log reception unit 44 receives the detection log transmitted from the ECU 22. The detection log reception unit 44 stores the detection log having a time stamp indicating the current date and time attached thereto in the log storage unit 40.

The determination unit 46 refers to the related ECU table of the table storage unit 42 and identifies the related ECU for the detection ECU indicated by the detection log. Further, the determination unit 46 refers to the control information table in the table storage unit 42 and determines whether the predetermined log collection start condition is met. The determination unit 46 of the embodiment determines that the log collection start condition is met when the detection log indicates that the important process defined in the control information table has been executed.

When it is determined that the log collection start condition is met, the determination unit 46 refers to the control information in the table storage unit 42 and determines the detail of control on the detection ECU and the related ECU that suits the important process indicated by the detection log. For example, the determination unit 46 determines to request the detection ECU to start collecting the evidence log when the control information table is as shown in FIG. 5 and the important process indicated by the detection log is "software update". Further, the determination unit 46 determines to request the related ECU (end) to collecting the evidence log and start the IPS operation. Further, the determination unit 46 determines to request the related ECU (non-end) to start collecting the evidence log. The monitoring control unit 48 controls the operation of each of the detection ECU and the related ECU based on the detail of control determined by the determination unit 46.

When the determination unit 46 determines that the log collection start condition is met, the evidence log collection unit 50 starts collecting the evidence log from the detection ECU and also starts collecting the evidence log from the related ECU. For example, the vehicle-mounted system of FIG. 2 starts collecting the evidence log from the ESW 14, the ADAS 16, and the control ECU 18 provided on the same route at a point of time when the software update in the IVI apparatus 12 is completed. The determination unit 46 determines whether each of the detection ECU and the related ECU is operating normally, based on the evidence log of the detection ECU and the evidence log of the related ECU collected by the evidence log collection unit 50. Stated otherwise, the determination unit 46 determines whether the important process executed in the detection ECU is authorized or unauthorized.

When the determination unit 46 determines that the detection ECU and the related ECU is operating normally, i.e., when it is determined that the important process executed in the detection unit ECU is authorized, the evidence log collection unit 50 stops collecting the evidence log from the detection ECU and the related ECU. In the embodiment, the monitoring control unit 48 stops transmission of the evidence log from the detection ECU and the related ECU when the determination unit 46 determines that the detection ECU and the related ECU are operating normally.

When the determination unit 46 determines that the detection ECU or the related ECU is operating abnormally, the evidence log collection unit 50 continues to collect the evidence log from the detection ECU and the related ECU. In this case, the determination unit 46 determines whether each of the detection ECU and the related ECU is operating normally again after an elapse of a predetermined period of time (e.g., one minute), based on the evidence log of the detection ECU and the evidence log of the related ECU newly acquired by the evidence log collection unit 50.

The evidence log collection unit 50 includes an evidence log reception unit 52, a log management unit 54, and a timer 56. The evidence log reception unit 52 receives the evidence log transmitted from each of the detection ECU and the related ECU. The evidence log reception unit 52 stores the evidence log having a time stamp indicating the current date and time attached thereto in the log storage unit 40. The log management unit 54 manages the detection log and the evidence log stored in the log storage unit 40. For example, the log management unit 54 identifies and deletes the log retained longer than a predetermined period, based on the time information output from the timer 56.

A description will now be given of the operation of the integrated monitoring apparatus 24 having the above-described configuration. FIG. 6 is a sequence chart showing the operation relating to the integrated monitoring apparatus 24 of the embodiment. The detection log reception unit 44 of the integrated monitoring apparatus 24 stands by until it receives a detection log from at least one ECU 22 of the plurality of ECUs 22 mounted on the vehicle 20 and subject to monitoring (S11). The ECU 22a of FIG. 6 is, for example, the IVI apparatus 12 of FIG. 2, and the ECU 22b is, for example, the ADAS 16 of FIG. 2. The ECU 22a executes an important process (e.g., system login). The abnormality detection unit 30 of the ECU 22a transmits a detection log as an important process completion notification to the integrated monitoring apparatus 24 (S12).

The detection log reception unit 44 of the integrated monitoring apparatus 24 receives the detection log and stores the detection log in the log storage unit 40 (S13) The determination unit 46 of the integrated monitoring apparatus 24 determines that the log collection start condition is met when the detection log indicates the execution of a predetermined important process. The determination unit 46 refers to the detection log and identifies the ECU 22a as the detection ECU. The determination unit 46 also refers to the related ECU table and identifies the ECU 22b as the related ECU (in this case, the related ECU that is not at the end is assumed) (S14).

Further, the determination unit 46 determines the detail of control on the detection ECU and the detail of control on the related ECU (non-end) by referring to the control information table. The monitoring control unit 48 of the integrated monitoring apparatus 24 transmits the information indicating the detail of control on the detection ECU to the ECU 22a, which is the detection ECU. Further, the monitoring control unit 48 transmits the information indicating the detail of control on the related ECU (non-end) to the ECU 22b, which is the related ECU (S15). In this case, the monitoring control unit 48 transmits control information requesting collection and transmission of the evidence log to each of the ECU 22a and the ECU 22b.

The evidence log recording unit 34 of the ECU 22a receives the control information from the integrated monitoring apparatus 24 and starts generating the evidence log in accordance with the control information. The evidence log transmission unit 36 of the ECU 22a starts transmitting the evidence log to the integrated monitoring apparatus 24 at a predetermined period (S16). Similarly, the evidence log recording unit 34 of the ECU 22b receives the control information from the integrated monitoring apparatus 24 and starts generating the evidence log in accordance with the control information. The evidence log transmission unit 36 of the ECU 22b starts transmitting the evidence log to the integrated monitoring apparatus 24 at a predetermined period (S17).

The evidence log reception unit 52 of the integrated monitoring apparatus 24 receives the evidence log transmitted from the ECU 22a and the evidence log transmitted from the ECU 22b and stores the evidence logs in the log storage unit 40. As already described, both the detection log and the evidence log include the detection ID. The detection log and the evidence log responsive to the same important process are linked by the same detection ID. The determination unit 46 of the integrated monitoring apparatus 24 determines whether the detection ECU and the related ECU are operating normally based on the evidence log stored in the log storage unit 40 (S18).

A description will be given of an example of the determination process of S18. For example, the determination unit 46, having repeated a plurality of steps of determination, may ultimately determine that the detection ECU and the related ECU are operating normally and terminates the determination process when the duration of time in which the detection ECU and the related ECU are determined to be operating normally continuously or when the number of times that the detection ECU and the related ECU are determined to be operating normally reaches a predetermined threshold value or more. When the number of times that errors are detected in the same important process (e.g., the number of times of failures in system login) reaches a predetermined threshold value or more in the related ECU or the related ECU, the determination unit 46 may determine that the relevant ECU is operating abnormally.

Alternatively, when the number of times of reception of detection logs of other abnormality type(s) and/or the number of types (e.g., the number of times of execution of port scans or the number of times of diagnosis tool authentication errors) reaches a predetermined threshold value or more n the detection ECU or the related ECU, the determination unit 46 may determine that the relevant ECU is operating abnormally. The "detection logs of other abnormality type(s)" are of the same format as the detection log for an important process completion notification but indicate an abnormality that could occur as an error in response to a wrong operation in a normal operation. It is assumed that the abnormality of this type is not configured to trigger monitoring (e.g., collection of an evidence log or start of IPS operation). In other words, the detection log that does not trigger monitoring may be subject to abnormality determination by the determination unit 46.

Further, the determination unit 46 may output information relating to the important process to the information output unit (the display unit, the speaker, or the like not shown) mounted on the vehicle 20 and notify the passenger that the important process has been executed. When a user operation of the passenger indicating that the important process is authorized is input, the determination unit 46 may determine that the detection ECU and the related ECU are operating normally. When a user operation of the passenger indicating that the important process is unauthorized is input, on the other hand, the determination unit 46 may determine that the detection ECU and the related ECU are operating abnormally.

Further, the determination unit 46 may determine whether the important process is authorized according to the combination of the traveling condition of the vehicle 20 and the type of the important process. When the important process is determined to be authorized, the determination unit 46 may determine that the detection ECU and the related ECU are operating normally. When the determination unit 46 determines that the important process is unauthorized, on the other hand, the determination unit 46 may determine that the detection ECU and the related ECU are operating abnormally. The traveling condition of the vehicle 20 may be inclusive of power off, at a halt (idling), or traveling. The determination unit 46 may acquire the traveling condition of the vehicle 20 from a traveling management apparatus or a sensor (not shown) and determine that the important process is unauthorized if the vehicle 20 is traveling and the important process is software update. This is because software update is not normally executed during a travel.

Figure 7:
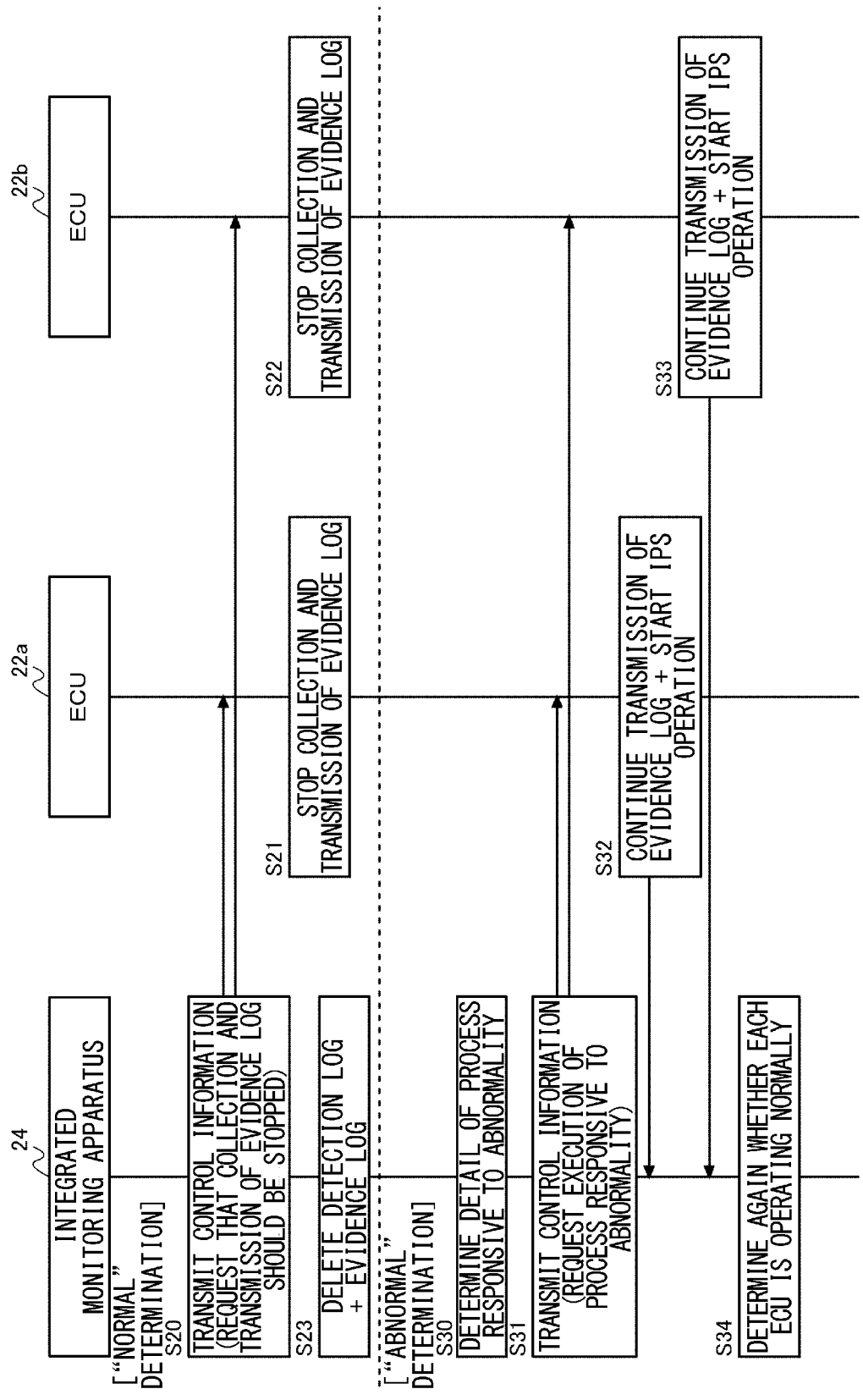
FIG. 7 is a sequence chart showing a continuation from the operation shown in FIG. 6.

FIG. 7 is a sequence chart showing a continuation from the operation shown in FIG. 6. When the determination unit 46 of the integrated monitoring apparatus 24 determines that the ECU 22a as the detection ECU and the ECU 22b as the related ECU are operating normally in S18, the monitoring control unit 48 of the integrated monitoring apparatus 24 transmits control information requesting that collection and transmission of the evidence log should be stopped to the ECU 22a and the ECU 22b (S20). The evidence log recording unit 34 and the evidence log transmission unit 36 of the ECU 22a stop generating and transmitting the evidence log in accordance with the control information received from the integrated monitoring apparatus 24 (S21). Similarly, the evidence log recording unit 34 and the evidence log transmission unit 36 of the ECU 22b stop generating and transmitting the evidence log in accordance with the control information received from the integrated monitoring apparatus 24 (S22). When the IPS is operating in the ECU 22a or the ECU 22b, the monitoring control unit 48 may include an instruction to stop the IPS in the control information transmitted.

Further, the monitoring control unit 48 of the integrated monitoring apparatus 24 transmits an instruction to delete the log, designating the detection ID of the important process that triggered the start of the determination process in the determination unit 46. The log management unit 54 deletes, from the plurality of logs stored in the log storage unit 40, the pair of the detection log and the evidence log that include the detection ID designated by the instruction for deletion (S23). In one variation adapted to the case in which the period of retaining the log is defined, the log management unit 54 may reduce the period of retaining the detection log and the evidence log that include the detection ID designated by the instruction for deletion to a duration shorter than normal (i.e., in the absence of the instruction for deletion).

When the determination unit 46 of the integrated monitoring apparatus 24 determines that at least one of the ECU 22a or the ECU 22b is operating abnormally in S18, the determination unit 46 determines the detail of the process responsive to the abnormality in accordance with the type of the important process executed in the detection ECU, site of detection of the abnormality, and type of the abnormality (S30). In one variation, the determination unit 46 may refer to the control information table in the log storage unit 40 as in S15 to determine the detail of the process responsive to the abnormality. Alternatively, the determination unit 46 may determine the detail of the process responsive to the abnormality by using a publicly known technology.

The monitoring control unit 48 of the integrated monitoring apparatus 24 transmits the control information requesting execution of the process responsive to the abnormality determined in S30 to the ECU 22 and the ECU 22b (S31). In the example of FIG. 7, the monitoring control unit 48 transmits control information requesting execution of the unauthorized invasion prevention process as the process responsive to the abnormality. The unauthorized invasion prevention unit 32 of the ECU 22a starts the unauthorized invasion prevention process. Further, the evidence log recording unit 34 and the evidence log transmission unit 36 of the ECU 22a continue generating and transmitting the evidence log (S32). Similarly, the unauthorized invasion prevention unit 32 of the ECU 22b starts the unauthorized invasion prevention process. Further, the evidence log recording unit 34 and the evidence log transmission unit 36 of the ECU 22b continue generating and transmitting the evidence log (S33).

The evidence log reception unit 52 of the integrated monitoring apparatus 24 continues receiving the evidence log transmitted from the ECU 22a and the ECU 22b. The determination unit 46 of the integrated monitoring apparatus 24 determines whether the ECU 22a and the ECU 22b are operating normally again after an elapse of a predetermined period of time since the previous determination (the determination in S18), based on the evidence log of the ECU 22a and the evidence log of the ECU 22b newly acquired by the evidence log reception unit 52 (S34). The determination process in S34 is similar to the determination process in S18. Subsequently, control is returned to S20 (in the case of "normal" determination) or S30 (in the case of "abnormal" determination).

According to the integrated monitoring apparatus 24 of the embodiment, excessive collection of the log from the ECU 22 subject to monitoring is prevented, and computer resources of the vehicle 20 such as the memory, the storage, etc. are prevented from being wasted. In further accordance with the integrated monitoring apparatus 24, a foreshadow of a possible attack can be captured at an early stage, and an attack or an abnormality can be easily prevented from being missed, by starting to collect a log in response to a particular important process irrespective of "normal" or "abnormal" operation.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

A description will be given of a variation. The determination unit 46 of the integrated monitoring apparatus 24 may determine that the log collection start condition is met upon receiving a detection log indicating that the abnormality detection unit 30 of the ECU 22 has detected a particular type of abnormality. Further, the determination unit 46 may determine that the log collection start condition is met when the control information requesting collection of a log is received from an apparatus at the support center. When, in response to an attack on a certain vehicle, attacks on other vehicles of the same type are monitored collectively, for example, the support center may transmit the control information requesting collection of a log to the integrated monitoring apparatus 24 of the other vehicles.

As another variation, a variation to the process responsive to an abnormality executed when the detection ECU or the related ECU is determined to be operating abnormally based on the evidence log will be described. This process here corresponds to the process of S30 of FIG. 7. The determination unit 46 expands the range of collection of the evidence log from the detection ECU and the related ECU based on the signal transmission route to the entirety of the vehicle 20. For example, the determination unit 46 may determine to collect the evidence log from all of the ECUs 22 capable of communicating with the integrated monitoring apparatus 24. The monitoring control unit 48 may request all of the ECUs 22 capable of communicating with the integrated monitoring apparatus 24 to transmit the evidence log.

Further, the integrated monitoring apparatus 24 may further include an abnormality notification unit and an evidence log transmission unit. When the detection ECU or the related ECU is determined to be operating abnormally based on the evidence log, the abnormality determination unit may notify an apparatus (e.g., the storage apparatus 28) at the support center of an outbreak of the abnormality. The evidence log transmission unit may transmit the evidence log transmitted from the detection ECU or the related ECU to the apparatus (e.g., the storage apparatus 28) at the support center.

In the embodiment described above, the functional unit subject to monitoring by the integrated monitoring apparatus 24 is configured to be the ECU. The functional unit subject to monitoring may not be only the ECU. For example, the functional unit subject to monitoring may be a virtual machine (VM).

The plurality of functional blocks included in the integrated monitoring apparatus 24 in the embodiment described above may be implemented in a distributed manner across a plurality of apparatuses. The process similar to the process of the integrated monitoring apparatus 24 may be implemented by causing these plurality of apparatuses to operate in coordination as a system (e.g., a monitoring system).

Any combination of the embodiment and the variation described above will also be useful as an embodiment of the present invention. A new embodiment created by a combination will provide the combined advantages of the embodiment and the variation as combined. It will be understood to a skilled person that the functions that the constituting elements recited in the claims should achieve are implemented either alone or in combination by the constituting elements shown in the embodiments and the variations.

The technologies according to the embodiment and variations may be defined by the following items.

[Item 1]

A monitoring apparatus mounted on a vehicle, including:
 a log collection unit that starts collecting a log from a functional unit mounted on the vehicle when a predetermined log collection start condition is met; and
 a determination unit that determines whether the functional unit is operating normally based on the log of the functional unit collected by the log collection unit, wherein
 when the determination unit determines that the functional unit is operating normally, the log collection unit stops collecting the log from the functional unit.

According to this monitoring apparatus, excessive collection of a log is prevented, and computer resources such as a memory, storage, etc. are prevented from being wasted.

[Item 2]

The monitoring apparatus according to item 1, wherein the log collection start condition is met when a predetermined important process is executed in the functional unit.

According to this monitoring apparatus, a foreshadow of a possible attack can be captured at an early stage, and an attack or an abnormality can be easily prevented from being missed, by starting to collect a log in response to a particular important process irrespective of "normal" or "abnormal" operation.

[Item 3]

The monitoring apparatus according to item 2, wherein the important process includes a predetermined process that requires a manager authority for execution.

According to this monitoring apparatus, an attack that spoofs an important process is detected precisely because an attack often accesses a manager authority.

[Item 4]

The monitoring apparatus according to any one of items 1 through 3, wherein
 when the determination unit determines that the functional unit is operating abnormally,
 the log collection unit continues to collect a log from the functional unit, and
 the determination unit determines whether the functional unit is operating normally after an elapse of a predetermined period of time, based on a newly acquired log of the functional unit.

According to this monitoring apparatus, analysis of abnormality is supported by continuing to collect a log while the functional unit is determined to be operating abnormally. By stopping collection of a log when the functional unit is determined to be operating normally, on the other hand, excessive collection of a log is prevented.

[Item 5]

The monitoring apparatus according to any one of items 1 through 4, wherein, when the log collection start condition is met based on a process in a first functional unit, the log collection unit starts collecting a log from the first functional unit and starts collecting a log from a second functional unit associated with the first functional unit.

According to this monitoring apparatus, analysis of an attack across a plurality of functional units (e.g., a springboard attack) is supported by collecting a log of a plurality of related functional units.

[Item 6]

A monitoring method executed by a computer mounted on a vehicle, including:
 starting to collect a log from a functional unit mounted on the vehicle when a predetermined log collection start condition is met;
 determining whether the functional unit is operating normally based on the log of the functional unit collected; and
 when the functional unit is determined to be operating normally, stopping collection of a log from the functional unit.

According to this monitoring apparatus, excessive collection of a log is prevented, and computer resources such as a memory, storage, etc. are prevented from being wasted.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No.

2022-032538, filed on Mar. 3, 2022, the entire contents of which are incorporated herein by reference.

What is claimed is:

1. A monitoring apparatus mounted on a vehicle, comprising:
a log collection unit that starts collecting a first log from a detection electronic control unit and a second log from each of at least one related electronic control unit when a predetermined log collection start condition is met, the detection electronic control unit and the at least one related electronic control unit being mounted on the vehicle and connected in series along a signal transfer route; and
a determination unit that determines whether the detection electronic control unit and the at least one related electronic control unit are operating normally based on the first log and the second log collected by the log collection unit, wherein
when the determination unit determines that the detection electronic control unit and the at least one related electronic control unit are operating normally, the log collection unit stops collecting the first log and the second log, and
when the predetermined log collection start condition is met, the log collection unit controls one of the at least one related electronic control unit at an end of the signal transfer route to start an intrusion prevention system operation.

2. The monitoring apparatus according to claim 1, wherein the log collection start condition is met when a predetermined important process is executed in the detection electronic control unit.

3. The monitoring apparatus according to claim 2, wherein the important process includes a predetermined process that requires a manager authority for execution.

4. The monitoring apparatus according to claim 1, wherein
when the determination unit determines that the detection electronic control unit and the at least one related electronic control unit are operating abnormally,
the log collection unit continues to collect the first log from the detection electronic control unit and the second log from each of the at least one related electronic control unit, and
the determination unit determines whether the detection electronic control unit and the at least one related electronic control unit are operating normally after an elapse of a predetermined period of time, based on newly acquired logs.

5. The monitoring apparatus according to claim 1, wherein
when the log collection start condition is met based on a process in the detection electronic control unit, the log collection unit starts collecting the first log from the detection electronic control unit and starts collecting the second log from each of the at least one related electronic control unit associated with the detection electronic control unit.

6. A monitoring method executed by a computer mounted on a vehicle, the monitoring method comprising:
starting to collect a first log from a detection electronic control unit and a second log from each of at least one related electronic control unit when a predetermined log collection start condition is met, the detection electronic control unit and the at least one related electronic control unit being mounted on the vehicle and connected in series along a signal transfer route;
determining whether the detection electronic control unit and the at least one related electronic control unit are operating normally based on the first log and the second log; and
when the detection electronic control unit and the at least one related electronic control unit are determined to be operating normally, stopping collection of the first log and the second log, and
when the predetermined log collection start condition is met, the computer controls one of the at least one related electronic control unit at an end of the signal transfer route to start an intrusion prevention system operation.

7. A monitoring apparatus mounted on a vehicle, the monitoring apparatus comprising:
a processor; and
a memory including a program that, when run by the processor, causes the processor to execute functions, the functions including:
start collecting a first log from a detection electronic control unit and a second log from each of at least one related electronic control unit when a predetermined log collection start condition is met, the detection electronic control unit and the at least one related electronic control unit being mounted on the vehicle and connected in series along a signal transfer route; and
determining whether the detection electronic control unit and the at least one related electronic control unit are operating normally based on the first log and the second log, wherein
when the processor determines that the detection electronic control unit and the at least one related electronic control unit are operating normally, the processor stops collecting the first log and the second log, and
when the predetermined log collection start condition is met, the processor controls one of the at least one related electronic control unit at an end of the signal transfer route to start an intrusion prevention system operation.

8. The monitoring apparatus according to claim 1, wherein
when the determination unit determines that the detection electronic control unit and the at least one related electronic control unit are operating normally, the log collection unit stops collecting the log from the functional unit and eliminates the first log and the second log collected thus far.

9. The monitoring apparatus according to claim 1, wherein
a priority of monitoring one of the at least one related electronic control unit at the end of the signal transfer route is higher.

10. The monitoring apparatus according to claim 1, wherein
when the determination unit determines that the detection electronic control unit and the at least one related electronic control unit are operating abnormally, the log collection unit continues collecting the first log and the second log and the determination unit again determines whether the detection electronic control unit and the at least one related electronic control unit are operating normally after an elapse of a predetermined period of time.

11. The monitoring apparatus according to claim 1, further comprising:
a sensor that detects a traveling condition of the vehicle, wherein
the determination unit determines whether the detection electronic control unit and the at least one related electronic control unit are operating normally based on the first log, the second log, and the traveling condition of the vehicle.

12. The monitoring apparatus according to claim 1, wherein
the intrusion prevention system operation prohibits access to a predetermined port of the one of the at least one related electronic control unit at the end of the signal transfer route.

* * * * *